(12) United States Patent
Estabridis

(10) Patent No.: US 8,885,893 B1
(45) Date of Patent: Nov. 11, 2014

(54) SYSTEM AND METHOD FOR ADAPTIVE FACE RECOGNITION

(71) Applicant: Secretary of the Navy, China Lake, CA (US)

(72) Inventor: Katia N. Estabridis, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 116 days.

(21) Appl. No.: 13/679,488

(22) Filed: Nov. 16, 2012

Related U.S. Application Data

(60) Provisional application No. 61/562,652, filed on Nov. 22, 2011.

(51) Int. Cl.
    *G06K 9/00* (2006.01)
(52) U.S. Cl.
    CPC .................................. *G06K 9/00288* (2013.01)
    USPC .......................................................... 382/118
(58) Field of Classification Search
    None
    See application file for complete search history.

(56) References Cited

U.S. PATENT DOCUMENTS

| 6,944,319 | B1 | 9/2005 | Huang et al. |
| 7,142,697 | B2 | 11/2006 | Huang et al. |
| 2005/0147292 | A1 | 7/2005 | Huang et al. |
| 2012/0063689 | A1* | 3/2012 | Tran et al. ..................... 382/224 |

OTHER PUBLICATIONS

Katia N. Estabridis, Automatic Target Recognition via Sparse Representations, Presentation to UCLA Inst for Digital Research and Education, Mar. 6, 2012, UCLA, Los Angeles, CA.

* cited by examiner

*Primary Examiner* — Chan Park
*Assistant Examiner* — Mark Roz
(74) *Attorney, Agent, or Firm* — James M. Saunders

(57) ABSTRACT

A system and method for adaptive face recognition includes at least one electronic processor having a central processing unit. At least one database having a plurality of pixilated face images of known subjects of interest is associated with the processor. At least one test image of a new subject of interest is configured for input into the electronic processor. A classification processing tool is associated with the electronic processor. The classification processing tool is configured to build a dictionary and provide a classification match of the test image with one of the plurality of pixilated face images of known subjects of interest. At least one device is associated with the processor and configured to output the classification match in a tangible medium.

14 Claims, 11 Drawing Sheets

SYSTEM AND METHOD FOR ADAPTIVE FACE RECOGNITION

CROSS-REFERENCE TO RELATED APPLICATIONS

This is a non-provisional application, claiming the benefit of parent provisional application No. 61/562,652 filed on Nov. 22, 2011, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to facial recognition and, more particularly, to a new way of facial recognition processing needing only one image for initial training, allowing the invention to simultaneously classify and learn from unlabeled data.

Figure 1A:
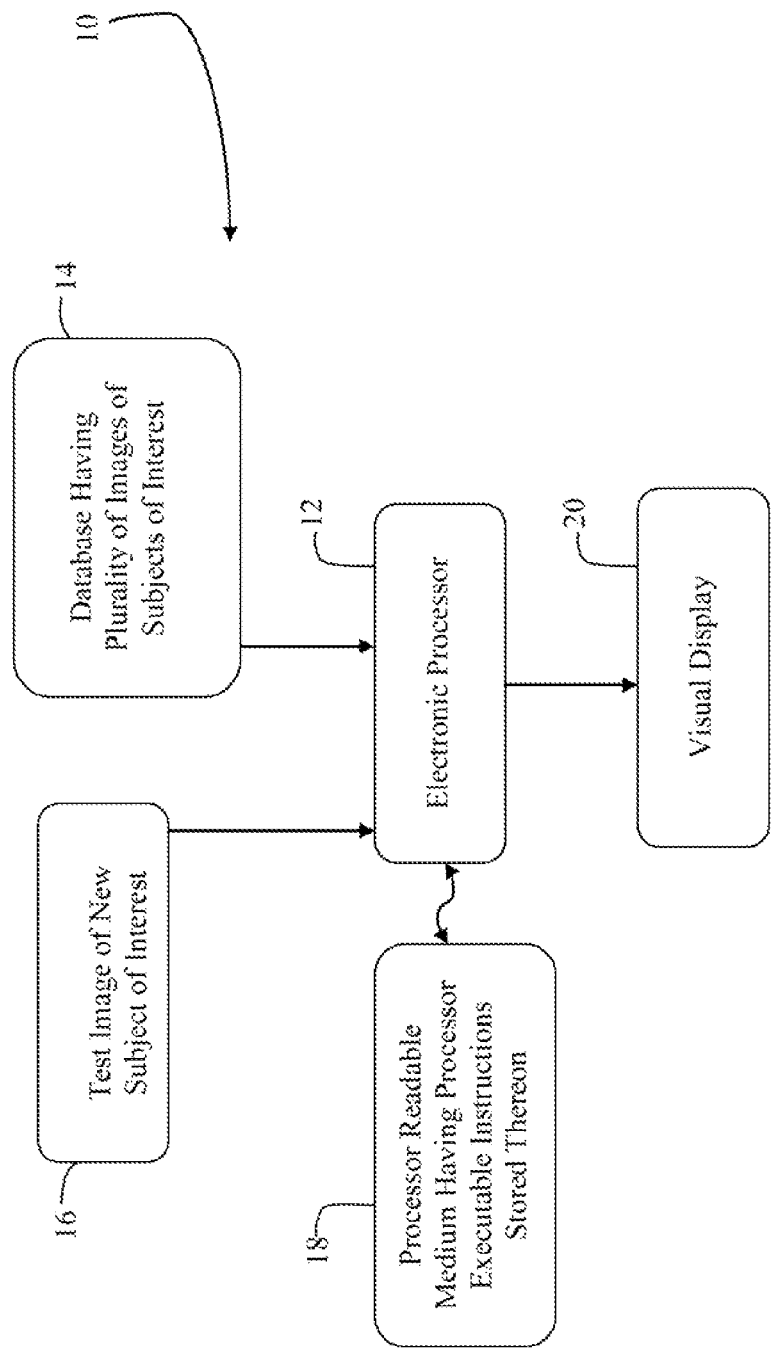
FIG. 1A is a system and its operational components for adaptive face recognition, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to facial recognition and, more particularly, to a new way of facial recognition processing needing only one image for initial training, allowing the invention to simultaneously classify and learn from unlabeled data.

Military and law enforcement agencies are interested in recognizing individuals that could be persons of interest in less restricting scenarios with a minimum of labeled data. Embodiments of the invention only need one image for initial training, allowing the invention to simultaneously classify and learn from unlabeled data. The embodiments are robust, allowing classification up to 30 degrees off axis, which will be very useful in airport environments and surveillance activities having multiple sensors.

Although embodiments of the invention are described in considerable detail, including references to certain versions thereof, other versions are possible. Examples of other versions include performing the tasks in an alternate sequence or hosting embodiments on different platforms. Therefore, the spirit and scope of the appended claims should not be limited to the description of versions included herein.

Certain embodiments of the invention may take the form of a computer program product on a computer-usable storage medium having computer-usable/readable program instructions embodied in the medium. Any suitable computer readable medium may be utilized including either computer readable storage media, such as, for example, hard disk drives, CD-ROMs, optical storage devices, or magnetic storage devices, or a transmission media, such as, for example, those supporting the internet or intranet.

Computer-usable/readable program instructions for carrying out operations of embodiments of the invention may be written in an object oriented programming language such as, for example, Python, Visual Basic, or C++. However, computer-usable/readable program instructions for carrying out operations of embodiments of the invention may also be written in conventional procedural programming languages, such as, for example, the "C#" programming language or an engineering prototyping language such as, for example, MATLAB®. The computer-usable/readable program instructions may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider or any other method known in the art).

Embodiments of the invention are described in part below with reference to flow chart illustrations and/or block diagrams of methods and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer-readable memory, including RAM, that can direct a computer or other programmable data processing apparatus to function in a particular manner, such that the instructions stored in the computer-readable memory produce an article of manufacture including instructions that implement the function/act specified in the flow chart and/or block diagram block or blocks.

These computer program instructions may also be loaded onto a computer or other programmable data processing apparatus to cause a series of operational tasks to be performed on the computer or other programmable apparatus to produce a computer implemented process such that the instructions that execute on the computer or other programmable apparatus provide tasks for implementing the functions/acts specified in the flow chart and/or block diagram block or blocks.

In the accompanying drawings, like reference numbers indicate like elements. FIG. 1A illustrates a system and its operational components for adaptive face recognition, according to embodiments of the invention. Reference character 10 depicts a system of embodiments of the invention. The system 10, may also be referred to as an apparatus, method, or a combination of both apparatus and method for shorthand purposes, without detracting from the merits or generality of embodiments of the invention.

Embodiments of the invention generally relate to an adaptive face recognition system, including at least one at least one electronic processor having a central processing unit 12. At least one database having a plurality of pixilated face images of known subjects of interest 14 is associated with the electronic processor 12. At least one test image, j, of a new subject of interest 16, is configured for input into the electronic processor. The test image, j, 16 is also a pixilated face image.

A classification processing tool 18 is associated with the electronic processor 12. The classification processing tool 18 is configured to build a dictionary, A, that is associated with the database 14. The classification processing tool 18 is configured to provide a classification match of the test image, j, 16 with one of the plurality of pixilated face images of known subjects of interest in the database 14. At least one device 20 is associated with the electronic processor 12 and is configured to output the classification match in a tangible medium.

Another embodiment of the invention generally relates to a method for adaptive face recognition using an electronic processor, including providing at least one database having a plurality of pixilated face images of known subjects of interest 14. At least one test image, j, is provided of a new subject of interest 16. The test image 16, j, is a pixilated face image configured for input into at least one electronic processor. A classification processing tool 18 is provided. The classification processing tool 18 is configured to build a dictionary, A, associated with the database 14. The classification processing tool 18 is configured to provide a classification match of the test image, j, 16 with one of the plurality of pixilated face images of known subjects of interest in the database 14. The classification match is output in a tangible medium 20.

Figure 1B:
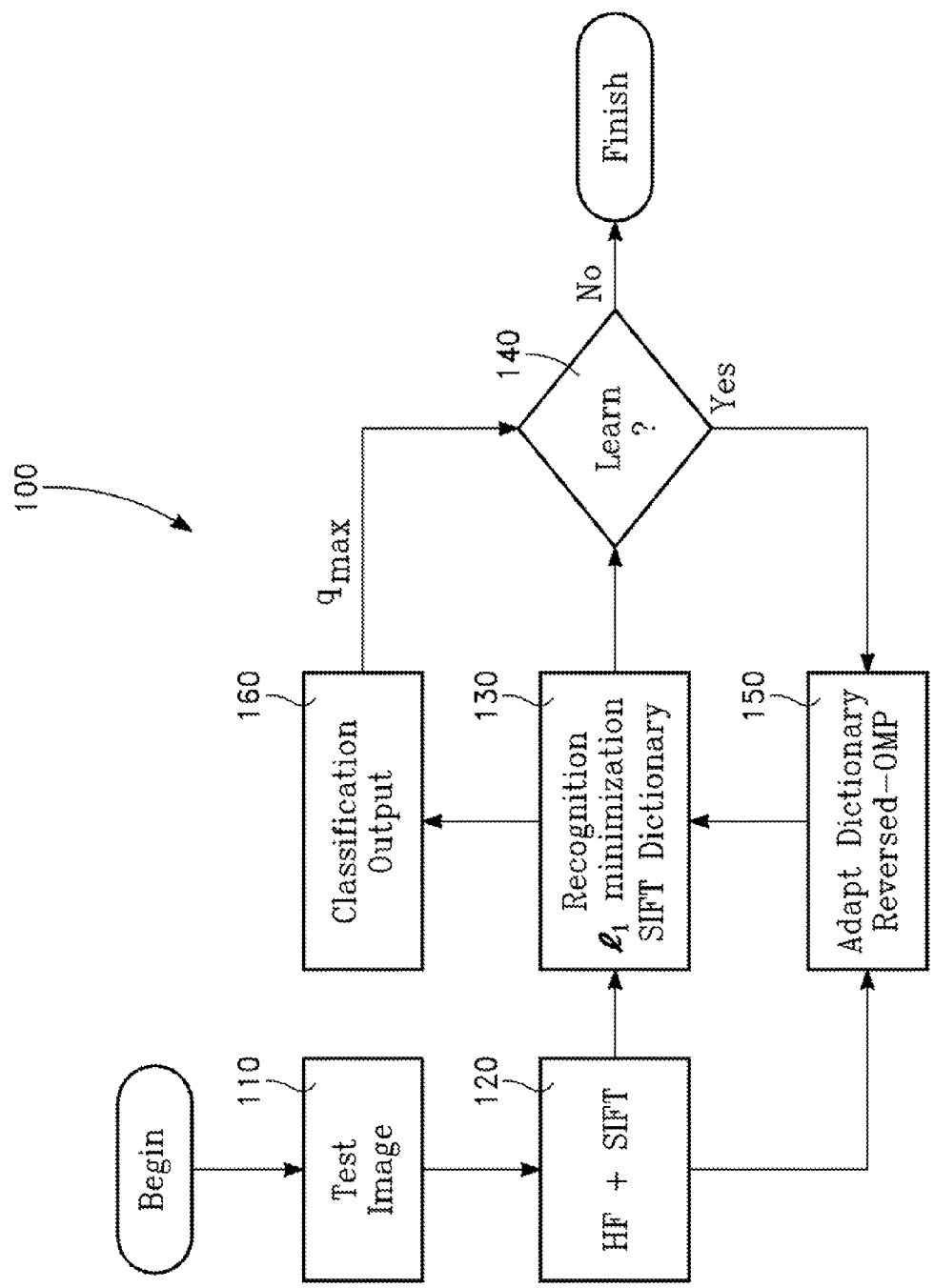
FIG. 1B is a block process diagram of a method for adaptive face recognition, according to embodiments of the invention.

FIG. 1B illustrates a block process diagram of a method for adaptive face recognition, according to embodiments of the invention, and is depicted as reference character 100. Referring to FIGS. 1A and 1B, the classification processing tool 18 (FIG. 1A) is a non-transitory electronic-processor-readable medium having a plurality of electronic processor executable instructions stored thereon. The executable instructions when executed by the electronic processor 12, cause the processor to perform several tasks to obtain a classification match of the test image, j 16 (FIG. 1A). This may also be referred to as a method of facial recognition, without detracting from the merits or generality of embodiments of the invention. As illustrated in FIG. 1B, the test image, j, is input into the electronic processor (task 110).

Adaptive high-pass filtering, HF, is performed on the test image, j, to increase the number of keypoints, KP, around areas of interest in the test image, j. The high-pass filtering reduces changes in illumination in the test image, j. The keypoints, KP, are structures of interest in the test image, j, including eyes, brows, nose, mouth, and hairline features. The adaptive high-pass filtering, HF, uses at least two high-pass filters having different spatial frequency bandwidths depending on the pixel size of the test image, j. At least one scale invariant feature transform (SIFT) descriptor, N, is computed for each test image, j (task 120).

The new subject of interest in the test image, j, is recognized by using an optimization technique, $l_1$, to search for a best match of the new subject of interest in the database (task 130). Information obtained from task 130 is simultaneously fed to tasks 140 and 160. It is determined whether to learn and alter the current knowledge of the dictionary, A (task 140). A class having the maximum energy, $q_{max}$, is outputted (task 160). When it is determined to learn, the dictionary, A, is adapted using reversed-orthogonal matching pursuit (OMP) (task 150). Tasks 130 through 150 are iterated through until it is determined not to learn. The determination may also be thought of as a determination whether to learn or not to learn. The determination is automatically performed. The processing of the test image, j, can be terminated in either task 140 when learning is not enabled or in task 130 after the dictionary, A, has been adapted with new knowledge by task 150.

The iteration, therefore, includes 1) the recognizing the new subject of interest in the test image, j, by using an optimization technique, $l_1$, to search for a best match of the new subject of interest in the database having a plurality of pixilated face images of known subjects of interest task; 2) the determining whether to learn and alter the current knowledge of the dictionary, A, task; and 3) the outputting a class having maximum energy, $q_{max}$, until it is determined not to learn.

Figure 2:
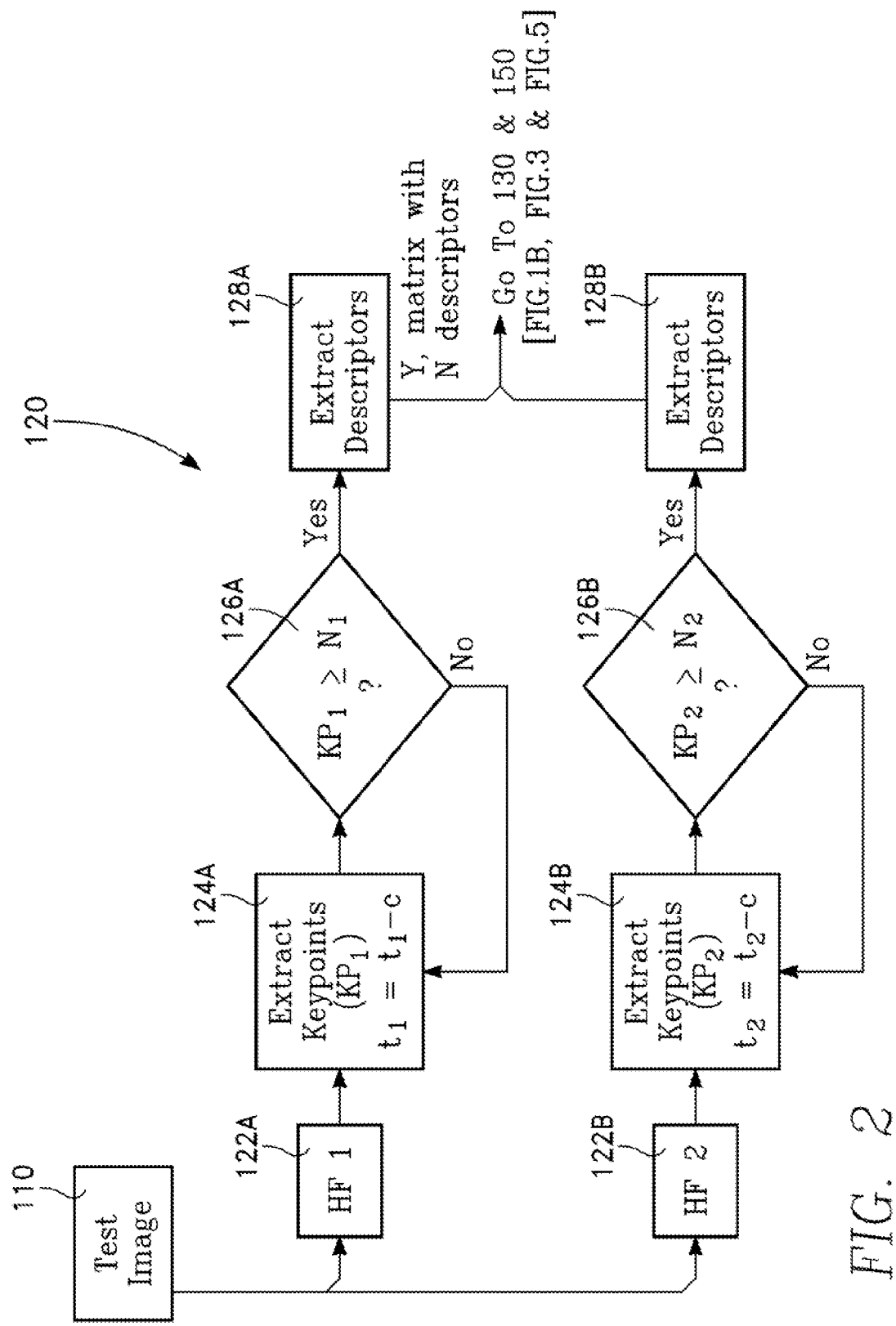
FIG. 2 is a block process diagram of adaptive high-pass filtering, according to embodiments of the invention.

FIGS. 2 through 6 illustrate tasks 120 through 160 in detail. FIG. 2, illustrates a block process diagram of adaptive high-pass filtering, according to embodiments of the invention. In the embodiments illustrated in FIG. 2, the adaptive high-pass filtering task (reference task 120), includes passing the test image, j, through at least two adaptive high-pass filters, HF (task 122A/B). A plurality of keypoints, KP, are extracted from the test image, j, by filtering the test image, j, with each high-pass filter, HF. The extracting is performed by lowering the threshold of strength, t. The threshold of strength, t, is defined by t=t−c, where c is a user-selected constant based on application-specific conditions. The threshold range is approximately 0.02 to 0.0001 and is unitless. In each pass through each adaptive high-pass filter, HF, at least one keypoint, KP, is selected (task 124A/B). Reference numerals 1 and 2 within the task blocks indicate tasks associated with the individual high-pass filtering passes.

In each pass through each of the adaptive high-pass filters, HF, it is determined whether the number of keypoints, KP, is greater than or equal to the number of descriptors, N. The determination is expressed as KP≥N. When the number of keypoints, KP, is not greater than or equal to the number of SIFT descriptors, N, an iteration occurs through the extracting a plurality of keypoints, KP, from the test image, j, task, until the number of keypoints KP is greater than or equal to the number of SIFT descriptors, N (task 126A/B).

In each pass through the adaptive-high pass filters, the SIFT descriptors, N, are extracted from the test image, j. The SIFT descriptors, N, are summed from each pass through each of the adaptive high-pass filters, HF. The summed result is a set of N-SIFT descriptors (task 128A/B).

Figure 3:
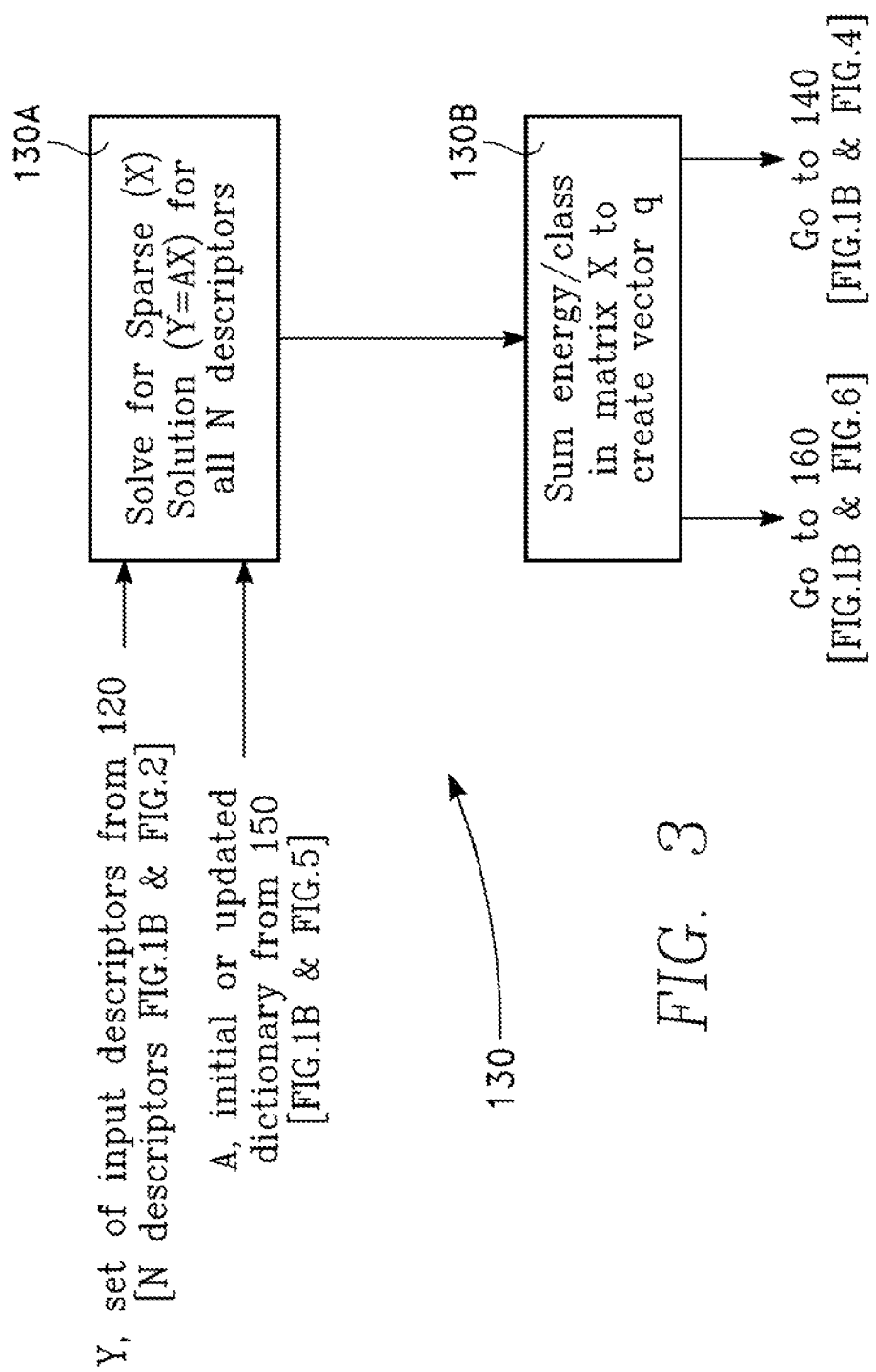
FIG. 3 is a block process diagram of recognition, according to embodiments of the invention.

FIG. 3 illustrates a block process diagram of recognition, according to embodiments of the invention. In the embodiments illustrated in FIG. 3, the recognition task (reference task 130), includes solving a matrix, X, by using a sparse solution. Matrix X is the sparse solution for each SIFT descriptor N in columns of matrix Y, where Y=AX (task 130A). The number of matches per class is summed. The number of matches per class is included in vector q, which is the vector solution extracted from matrix X for each class, c. (task 130B).

Figure 4:
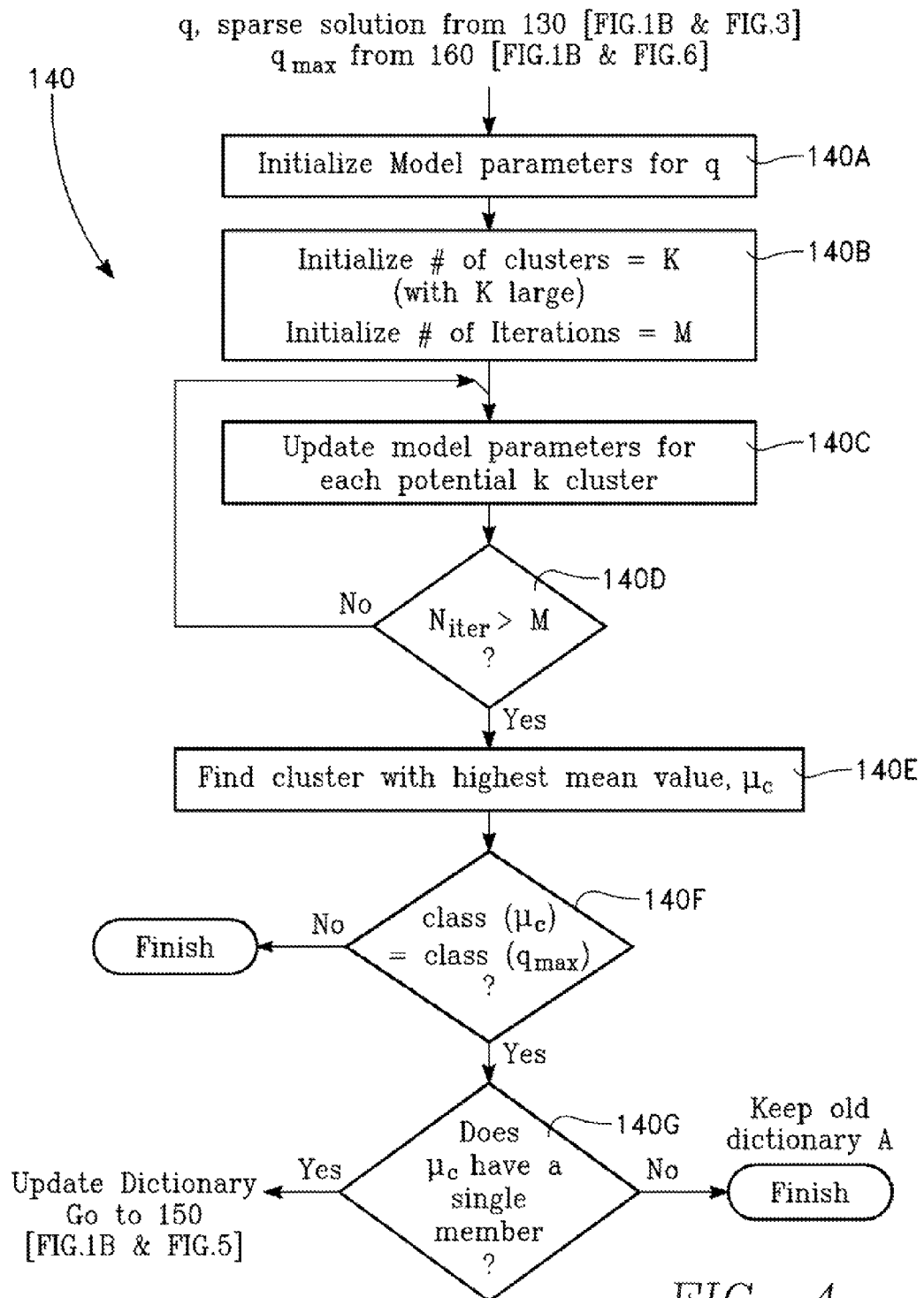
FIG. 4 is a block process diagram of determining whether to learn, according to embodiments of the invention.

FIG. 4 illustrates a block process diagram of determining whether to learn, according to embodiments of the invention. In the embodiments illustrated in FIG. 4, the determination whether to learn task (reference task 140), includes initializing model parameters for the summed number of matches per class, q (140A). The number of clusters are initialized to a user defined number, K. Each potential cluster is a Gaussian distribution selected from the group of matches consisting of the summed number of matches per class vector, q (task 140B).

The number of iterations, M, are initialized to a user-selected number to update the model parameters and each Gaussian distribution. The actual number of iterations performed, $N_{iter}$, is initialized to 1 on the first iteration of the number of iterations, M. $N_{iter}$ increases by 1 each time through the iteration (task 140B continued). A range of about 500 to 1000 iterations is typical.

The model parameters for each potential k cluster are updated (task 140C), where k=1, 2, ... K. A determination is made whether the actual number of iterations performed, $N_{iter}$, is greater than M. When the number of actual iterations performed, $N_{iter}$, is not greater than M, tasks 140C and 140D are iterated through until the actual number of iterations performed, $N_{iter}$, is greater than M (task 140D).

A cluster with the highest mean value, $\mu_c$, is determined automatically when the model parameters are updated (task 140E). When the cluster with the highest mean value, $\mu_c$, does not belong in the same class as $q_{max}$, learning does not occur and the dictionary A is not updated (task 140F). When the cluster with the highest mean value, $\mu_c$, belongs in the same class as $q_{max}$, a determination is made whether the cluster with the highest mean value, $\mu_c$, has a single member. When the cluster with the highest mean value, $\mu_c$, does not have a single member, learning does not occur and the previous dictionary, expressed as $A_{c(j-1)}$ is not updated. When the cluster with the highest mean value, $\mu_c$, does have a single member, learning does occur and the previous dictionary, $A_{c(j-1)}$, is updated to $A_{cj}$, with the columns of matrix Y (task 140G).

Figure 5:
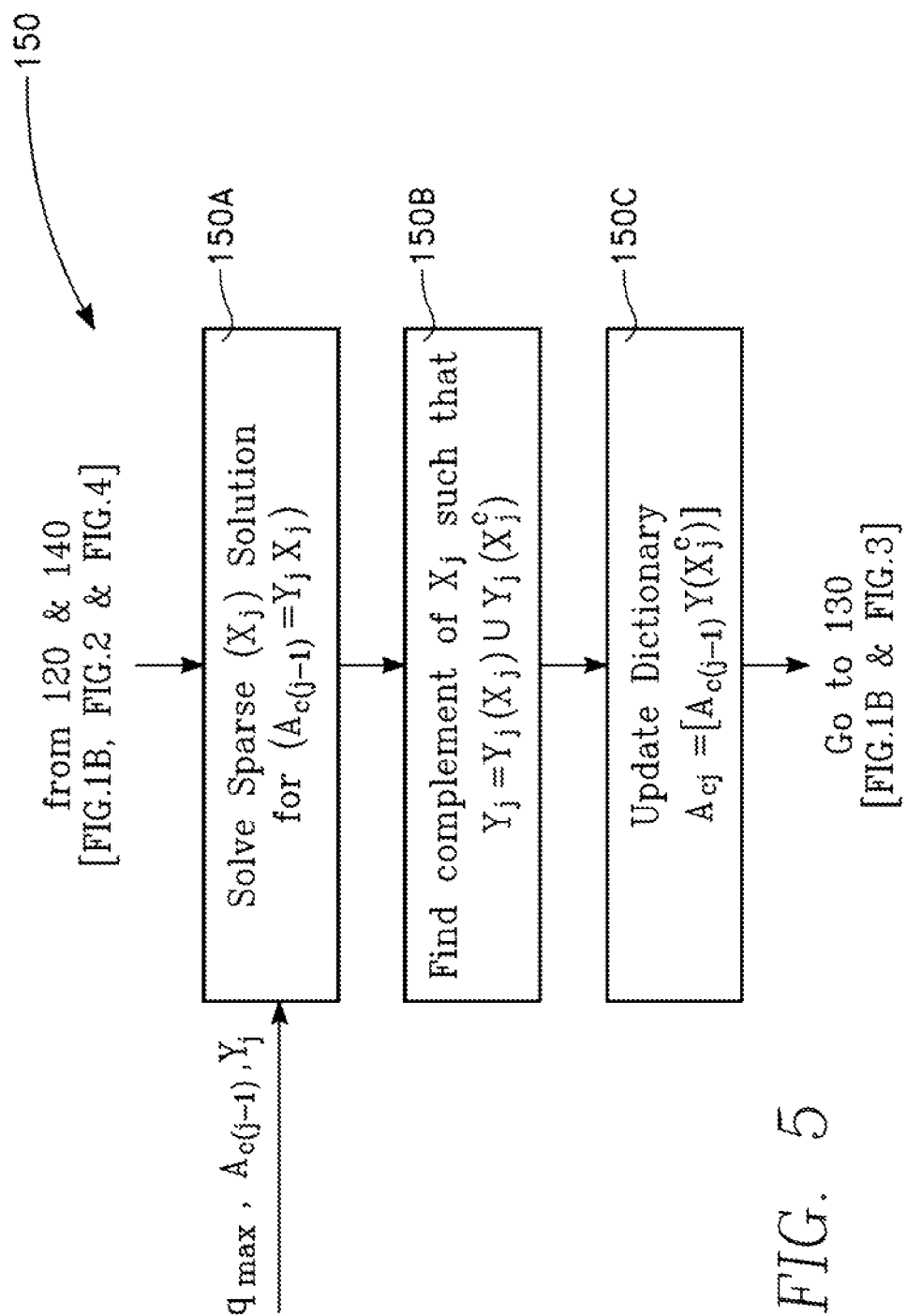
FIG. 5 is a block process diagram of dictionary adaptation, according to embodiments of the invention.

FIG. 5 illustrates a block process diagram of dictionary adaptation, according to embodiments of the invention. In the embodiments illustrated in FIG. 5, the adapting of the dictionary, A, using reversed-OMP (reference task 150), includes inputting the columns of updated matrix, $Y_j$, for the dictionary, $A_{c(j-1)}$, and $q_{max}$, which indicates the class to be updated $A_{c(j)}$, into a matrix $X_j$ by using a sparse solution. Matrix $X_j$ is the sparse solution, such that $A_{c(j-1)} = Y_j X_j$, where $Y_j$ is the set of N-SIFT descriptors extracted from test image, j (task 150A). A complement of $X_j$ is found, where $Y_j = Y_j(X_j) \cup Y_j(X_j^c)$. $X_j^c$ is the set of N-SIFT descriptors not used in the sparse solution and is also the complement of $X_j$ (task 150B). Dictionary $A_{c(j-1)}$ is updated to $A_{c(j)}$, where $A_{cj} = [A_{c(j-1)} Y(X_j^c)]$ (task 150C).

Figure 6:
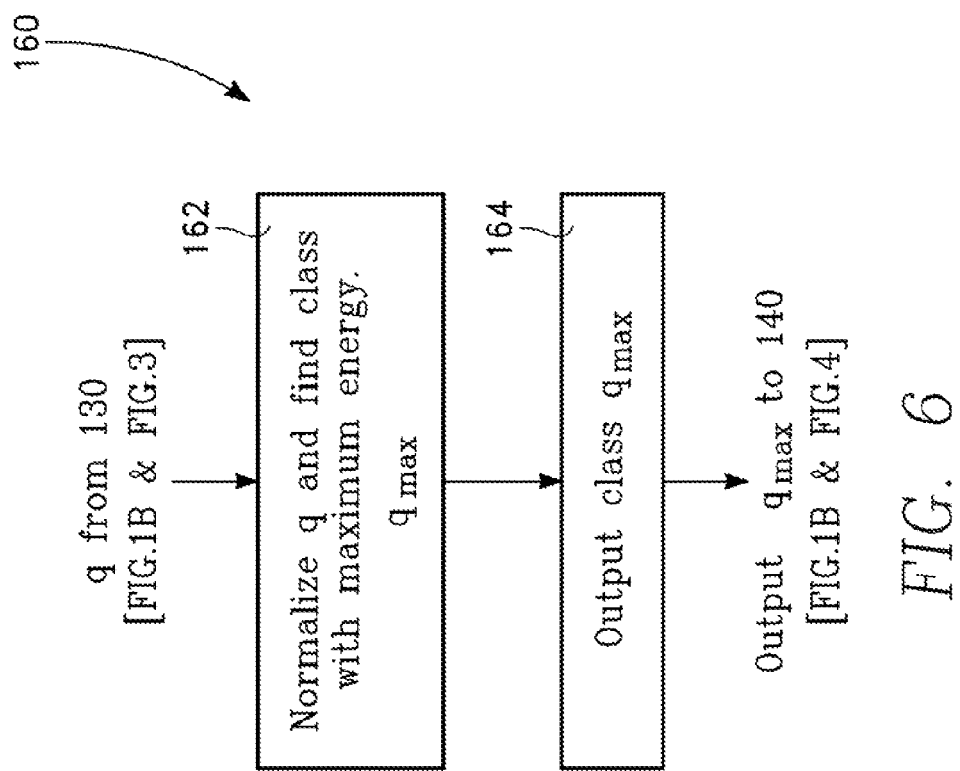
FIG. 6 is a block process diagram of classification output, according to embodiments of the invention.

FIG. 6 illustrates a block process diagram of classification output, according to embodiments of the invention. In the embodiments illustrated in FIG. 6, the outputting a class having the maximum energy, $q_{max}$, includes, (reference task 160) normalizing the number of matches per class, vector q, to find the class with the maximum energy, $q_{max}$ (task 162). The class having the maximum energy, $q_{max}$, is output in a tangible medium (task 164).

Some embodiments may be thought of as an entire network or part of a network that exchanges information with a global information grid (GIG) using a set of communication and data links, without detracting from the merits or generality of embodiments of the invention. As such, a person having ordinary skill in the art will recognize that the electronic processor 12 (FIG. 1A), may function as a processing/control station and be located many miles away such as, for example, at a location that would make use of a networked communication system of satellites or the like. Similarly, a person having ordinary skill in the art will recognize that "at least one" can mean one or higher number. As such, for simplicity, "at least one" is sometimes referred to as "a," "an," or "the" such as, for example, describing "at least one test image" as "an image" or "the image" to describe both singular and plural conditions without detracting from the merits or generality of embodiments of the invention.

In embodiments, the tangible outputs may be shown and/or represented as a visual display screen depiction (reference character 20 in FIG. 1A), hard copy printouts, as well as other media using classification/matching information such as, for example, a computer having computer-readable instructions that is configured to use output from embodiments of the invention.

Embodiments of the invention present an efficient construction that successfully addresses the case of having only a single image sample of a person available for training. A dictionary composed of regional descriptors serves as the basis for the recognition system while providing a flexible framework to augment or update the dictionary. Embodiments of the invention use an algorithm based on $l_1$ minimization techniques and the decision to update the dictionary is made in an unsupervised mode via non-parametric Bayes.

Dictionary learning is done via reverse-OMP to select atoms, also referred to as columns, that are orthogonal or near orthogonal to the current dictionary elements. Embodiments of the invention were tested with two publically-available face databases. Embodiments of the invention showed the capability to handle illumination, scale, and moderate pose and expression variations. Classification results as high as 96 percent were obtained using a Georgia Tech University (GT) publically-available database and 94 percent correct classification rates for a publically-available Carnegie Mellon University (CMU) multiple pose, illumination and expression (Multi-PIE) database for frontal-view scenarios.

Facial recognition is a process utilized in multiple settings from security to entertainment scenarios driving vast ongoing research. Commercial as well as defense-oriented applications cover a wide range of applications, from mobile phone applications that survey social scenes to systems being utilized to identify enemy combatants. It is a non-intrusive way to conduct identification or verification on subjects of interest. Although advances have been made in this area, face recognition still remains a complex problem that has to address challenges associated with the natural characteristics of faces, placing them in an object class of its own. Faces are non-rigid objects with soft transitions, deformable properties and with three-dimensional inherent structure. Additionally changes in appearance such as, for example, hairstyle, glasses, and hats combine with the common patterns that exist among faces make facial recognition a challenging problem.

Developing a traditional robust recognition system requires a complete training data set that includes all possible transformations that an individual's face can undergo. Such a complete data set is rarely available to a system developer resulting in system performance that is highly dependable on how well the training data set spans future data. A more realistic scenario is the one where data becomes available in a sequential rather than a parallel manner. A more desirable recognition system, therefore, is one that can learn from new unlabeled data by self-adapting and linking new information to existing knowledge. Based on these ideas, embodiments of the invention were developed.

It is assumed that initially only a single sample per person is available. The algorithm extracts invariant features from the initial sample to create the beginning dictionary, which is updated during the learning process. In addition to classifying the input image, the algorithm decides whether or not to learn from the new data and then how to learn from it. The proposed framework exploits ideas of sparsity, feature invariant dictionaries, and Variational Bayes (VB) techniques.

Embodiments of the invention have an initial training phase (once), a recognition phase, and a learning phase. Given a training image, features are computed and stored in a sub-dictionary as columns of a matrix $A_c=[a_{c1}, a_{c2}, \ldots, a_{cNc}]$ for a given class. The initial dictionary for all c classes is a concatenation of all the sub-dictionaries or descriptors per class into $A=[A_1, A_2, \ldots, A_c]$. The recognition problem is then formulated as a sparse representation where the system, $y_i=Ax_i$ is an undetermined system of equations, with $y_i \in R^{M \times 1}$, i=1, 2, ..., N, descriptor from the test image, $x_i \in R^{K \times 1}$, i=1, 2, ..., N, the sparse solution for each descriptor and $A \in R^{M \times K}$ (M<<K) is the dictionary.

The final sparse solution matrix includes the matches for each input descriptor from the test image in relation to all the classes present in the dictionary. The class with the most number of votes is selected as the class that identifies the subject. Utilizing SIFT as dictionary atoms eliminates the need to align test images with the training images providing resilience to pose, scale and illumination changes. The SIFT keypoint selection process was modified to attain keypoint-normalization, plus a filtering stage in order to enhance the soft edges that are characteristic of faces. The learning decision process is fully automated and it is based on VB techniques. Learning involves altering the current knowledge of the dictionary, thus it has a long-term impact on the system. Employing non-parametric Bayes techniques reduces uncertainty and the risk associated with learning while eliminating the need to train a classifier.

Embodiments of the invention are an adaptable and computationally-efficient recognition algorithm capable of handling scenarios where very few training samples are available. The algorithm learns from the unlabeled data therefore minimizing the need for large training data sets. The other contribution consists in the development of a new and efficient method to combine SIFT descriptors from different images within a learning framework.

Formulating the recognition problem as a sparse representation offers a variety of advantages. First, a recognition problem by definition has a sparse solution when compared against an entire database since the object under test can only belong to one class. Second, powerful tools developed under compressed sensing by can be exploited. And most importantly, dictionaries offer a flexible setting to add new classes, new dictionary atoms to an existing class, and to replace existing dictionary atoms when needed. It is with these basic ideas that the underlying system has been developed. The goal is to design a flexible framework where simultaneous classification and learning are possible for scenarios where labeled data is limited. Embodiments of the invention present a sparse formulation for face recognition and feature learning from unlabeled data which results in improved system performance. Included in the embodiments of the invention are algorithm functions that include adaptive filtering and keypoint selection, SIFT at keypoints, recognition, and learning.

The SIFT keypoint detector is designed for detection and recognition of rigid structures which differ from the natural facial structure. Points of interest in a face are concentrated around the eyes, brows, nose, mouth and hairline. An adaptive high-pass filter bank is applied as a pre-processing step to enhance the structures of interest within the face while minimizing illumination changes, assuming that the illumination is slowly varying across the face. At the same time the keypoint selection threshold is decreased automatically until at least N keypoints are obtained. This task encourages balance among the number of descriptors obtained per image regardless of image contrast. The SIFT descriptors are computed only after the desired N points are obtained. The final number of keypoints obtained for each image is not required to be identical since the descriptor count per class obtained during the recognition phase is normalized.

SIFT descriptors for each image class are computed and stored as columns of the dictionary. SIFT is summarized in four major tasks: scale space extrema, keypoint localization, orientation assignment, and descriptor representation. The SIFT descriptor representation is a vector which is invariant to scale, translation, in-plane rotations, and partially invariant to illumination and geometric distortions.

The recognition problem is a two-task process formulated within the sparse representation framework. First, the algorithm finds a sparse representation for each SIFT descriptor obtained from the test image. Second, it finds the class with the maximum number of descriptor matches. The set of N descriptors obtained from the test image is represented as Y=AX. Each column in Y is $y_i \in R^{M \times 1}$, i=1, 2, ..., N, and each column in X is the sparse solution $x_i \in R^{K \times 1}$, i=1, 2, ..., N for each of the descriptors obtained from the test image by solving equation (1) below, where the solution to each descriptor is a very sparse linear combination of the atoms in $A \in R^{M \times K}$ (M<<K):

$$\min_x \|x_i\|_1 \text{ subject to } y_i = Ax_i \qquad (1)$$

The solution for the $l_1$ minimization problem in equation (1) can be approximated with Orthogonal Matching Pursuit (OMP), a greedy algorithm. OMP can yield equivalent results to those of the basis pursuit algorithm (gradient type technique) which has been shown to be robust to noise. OMP is an attractive choice for its speed and ease of implementation. Computational efficiency is important since this approach involves solving for the sparse solution N times, which could be done in parallel since each solution is independent of the others. The resultant matrix $X=[x_{11}, x_{12}, \ldots, x_{CNc}]$ including the solution for all the test input descriptors is used to count the matches obtained for each class. The class, $q_c$, with the maximum energy is selected for identification and potential learning using equation (2) below:

$$q_c = \sum_{j=1}^{n} \frac{x_{cj}}{N_c}, \quad (2)$$

where $N_c$ is the total number of descriptors in class c and n is the number of classes present in the dictionary.

Learning can benefit any kind of system as long as the learning is conducted in a meaningful way. Learning by definition means acquiring new information or modifying existing knowledge. Humans perform this task on a daily basis, sometimes intentionally and others times unintentionally, resulting in improved skills and knowledge.

In this framework, the goal is to improve system performance by incorporating a learning behavior into the algorithm under the assumption that labeled data is limited. The approach takes advantage of unlabeled data to expand its current dictionary knowledge. Two matters addressed during the learning process include deciding when to learn and deciding how to learn. The when to learn is solved using non-parametric Bayes and the how to learn is solved using reversed-OMP.

The class having the maximum number of votes from equation (2) is selected for identification during the recognition process. This maximum is sufficient to provide the best guess match to the user from a recognition perspective, but it is not enough from a learning perspective. Learning involves modifying existing knowledge which can have a negative long-term impact on system performance such as, for example, should the system learn from the wrong class. Therefore, uncertainty is minimized when making the learning decision. Reformulating the learning decision as a clustering problem poses a new question regarding whether the class with the maximum number of votes is in a cluster of its own.

Non-parametric Bayes is a probabilistic approach to making a decision in an unsupervised manner with no need for training. K-means provides an alternative method, but it uses prior knowledge of the number of clusters in the distribution. Non-parametric Bayes resolves the number of clusters from the data itself while providing the means to making the learning decision within a probabilistic framework.

A Gaussian mixture model has enough level of complexity to not only model the data, but to learn its clustering structure. The sparse solution sum, q in equation (2), for all classes, can be modeled with a superposition of Gaussian densities. The joint distribution for all random variables in the model is given by:

$$P(X,Z,\pi,\mu,\gamma) = P(X/Z,\mu,\gamma)P(Z/\pi)P(\pi)P(\mu,\gamma)$$

$$P(X/Z,\mu,\gamma) = \prod_{n=1}^{N}\prod_{k=1}^{K} N(x_n/\mu_k, \gamma_k^{-1})^{z_{nk}}$$

$$P(Z/\pi) = \prod_{n=1}^{N}\prod_{k=1}^{K} \pi_k^{z_{nk}}$$

$$P(\pi) = \mathrm{Dir}(\pi/\alpha_0)$$

$$P(\mu,\gamma) = \prod_{k=1}^{K} N(\mu_k/m, \beta^{-1})\mathrm{Gamma}(\gamma_k, /a, b)$$

$$\ln q(Z) = E_\pi[\ln P(Z/\pi)] + E_{\mu,\gamma}[\ln P(X/Z,\mu,\gamma)]$$

$$\ln q(Z) = \sum_{n=1}^{N}\sum_{k=1}^{K} z_{nk} \ln \rho_{nk} + \mathit{const}$$

$$\ln \rho_{nk} = E[\ln \pi_k] + \tfrac{1}{2}[E[\ln \gamma_k] - E[\gamma_k](x - E[\mu_k])^2]$$

$$E[\ln \pi_k] = \psi(\alpha_k) - \psi\left(\sum_{j=1}^{K} \alpha_j\right)$$

$$E[\ln \gamma_k] = \psi(\alpha) - \ln b$$

$$r_{nk} = \frac{\rho_{nk}}{\sum_{j=1}^{K} \rho_{nj}} \quad (3)$$

$$\beta_k = \beta_0 + \sum_{n=1}^{N} r_{nk} E[\gamma_k] \quad (4)$$

$$m_k = \frac{1}{\beta_k}\left[\beta_0 m_0 + E[\gamma_k]\sum_{n=1}^{N} r_{nk} x_n\right] \quad (5)$$

$$\alpha_k = \alpha_0 + \sum_{n=1}^{N} r_{nk} \quad (6)$$

$$b_k = b_0 + \frac{1}{2}\sum_{n=1}^{N} r_{nk}(x_n - E[\mu_k])^2 \quad (7)$$

$$a_k = a_0 + \frac{1}{2}\sum_{n=1}^{N} r_{nk} \quad (8)$$

VB techniques are performed by cycling through equations (3) through (8), which define the model parameters of embodiments of the invention. Meaningful learning occurs when new information is acquired and linked to existing knowledge. Therefore the goal is to acquire only new descriptors from the test image not present in the selected dictionary class. Choosing to keep all the descriptors from the test image by simply incorporating them into the dictionary would be inefficient and redundant since some of the descriptors from the test image are already represented in the current dictionary. Furthermore increasing the redundancy of the dictionary and its size would result in declining performance.

Reverse-OMP is the proposed technique to conduct the actual learning process in order to learn as orthogonally as possible to the current set of atoms for a given dictionary class. Descriptors that offer novelty are the only ones of interest thus the need to engage in near-orthogonal learning. The descriptor dictionary is an over-complete basis meaning that the atoms in the current dictionary are already correlated at some level, thus the term near-orthogonal. These ideas are similar to those presented in compressed sensing theory where an ideal basis is an orthonormal basis which has more information than an over-complete basis of the same size. Reverse-OMP provides a way to find the least correlated descriptors from the test image to those of the selected dictionary class $A_c=[a_{c1}, a_{c2}, \ldots, a_{cNc}]$. This is opposite to solving for equation (1) where the sparse solution was the desired one. In this case although solving for $A_c=Y_jX_j$, the desired solution is $X_j^c$, with $Y_j \in R^{M \times P}$ being the set of descriptors obtained from the test image, and $X_j^c$ indicating the descriptors that were not used while solving for equation (9) such that $Y_j=Y_j(X_j) \cup Y_j(X_j^c)$. The new dictionary after learning from input image j is $A_{cj}=[A_{c(j-1)}\ Y(X_j^c)]$, wherein equation (9) is $$\min_x \|x_{jd}\|_0 \text{ subject to } Y_j x_{jd} = a_{cd}, d = 1, 2, \ldots, N_c \quad (9)$$

Dictionary adaptation may also be conducted while the number of atoms of the dictionary class is under a predetermined size, atoms $(A_c) < S_c$. This is done to keep the number of descriptors in the dictionary manageable. At each learning stage a maximum of n new atoms can be added to a dictionary class. Replacement of the dictionary atoms for a given class can occur after the dictionary has reached size $S_c$ and when the atom has never been used for classification prior to that point. The conjecture is that when an atom's history shows no usage, then it is a non-descriptive atom.

The GT and the CMU Multi-PIE databases were used to evaluate the algorithm. The GT database has 50 subjects with images that include variations in illumination, facial expression, appearance, scale, and viewpoint changes. Fifteen color images were collected for each individual during a period of six months. The GT images were converted to gray level images and the cropped version of the database was utilized. The GT images were obtained in a much less constrained scenario than that of the Multi-PIE ones. The training image for each subject was chosen as close as possible to a frontal view and with good illumination to initially train the dictionary. The remaining 14 images were used for testing. It took two iterations to achieve a recognition rate of 96 percent. The first iteration achieved 88 percent, the second one 96 percent. It should be noted that the embodiments of the invention algorithm only re-visits those images that yield an ambiguous answer which disables the learning mode. This approach improves the computational efficiency of the algorithm.

The Multi-PIE database had 337 subjects captured under 19 illumination conditions with 15 view points in four recording sessions for a total of more than 750,000 images. Each session had a different number of subjects with session 1 including 249 out of the 337 subjects. There were 13 cameras located at head height in 15 degree intervals for all sessions. Additionally, two other cameras were located above the subject. The Multi-PIE images were cropped prior to processing. The training image for the embodiments of the invention algorithm was selected from session 1 for each subject from a frontal view, under full illumination taken with neutral expression.

Sessions 1 and 2 for images with 0 degrees, 15 degrees, and 30 degrees change in viewpoint were analyzed. The training image was the same frontal view one utilized to classify the frontal-view cases. Three iterations were performed using the embodiments of the invention algorithm (SIFT-OMP). Embodiments of the invention performed very well.

Figure 7:
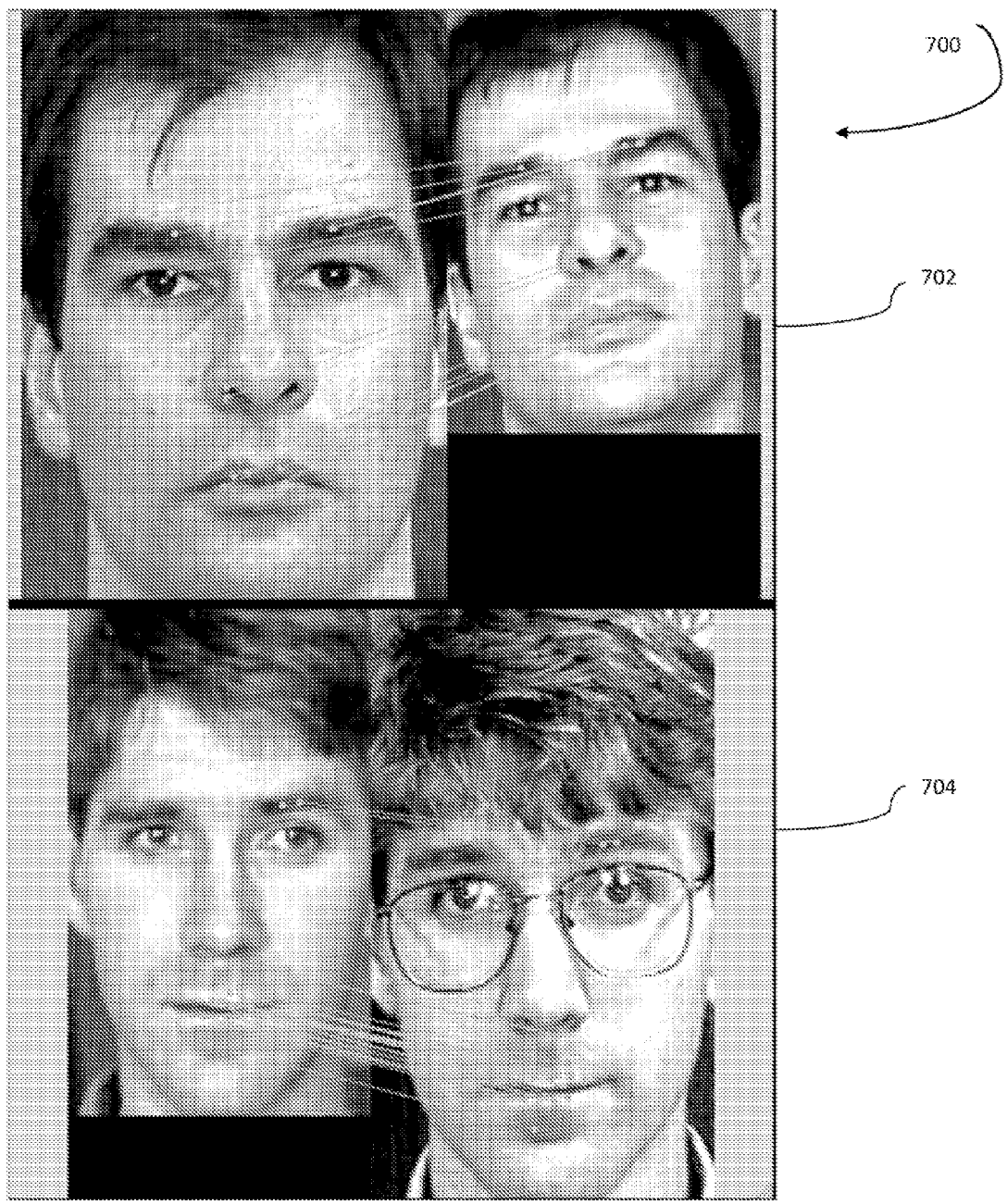
FIG. 7 illustrates a working example of feature matching of images having scale (upper images) and scale & appearance (lower images) changes, according to embodiments of the invention.
Figure 8:
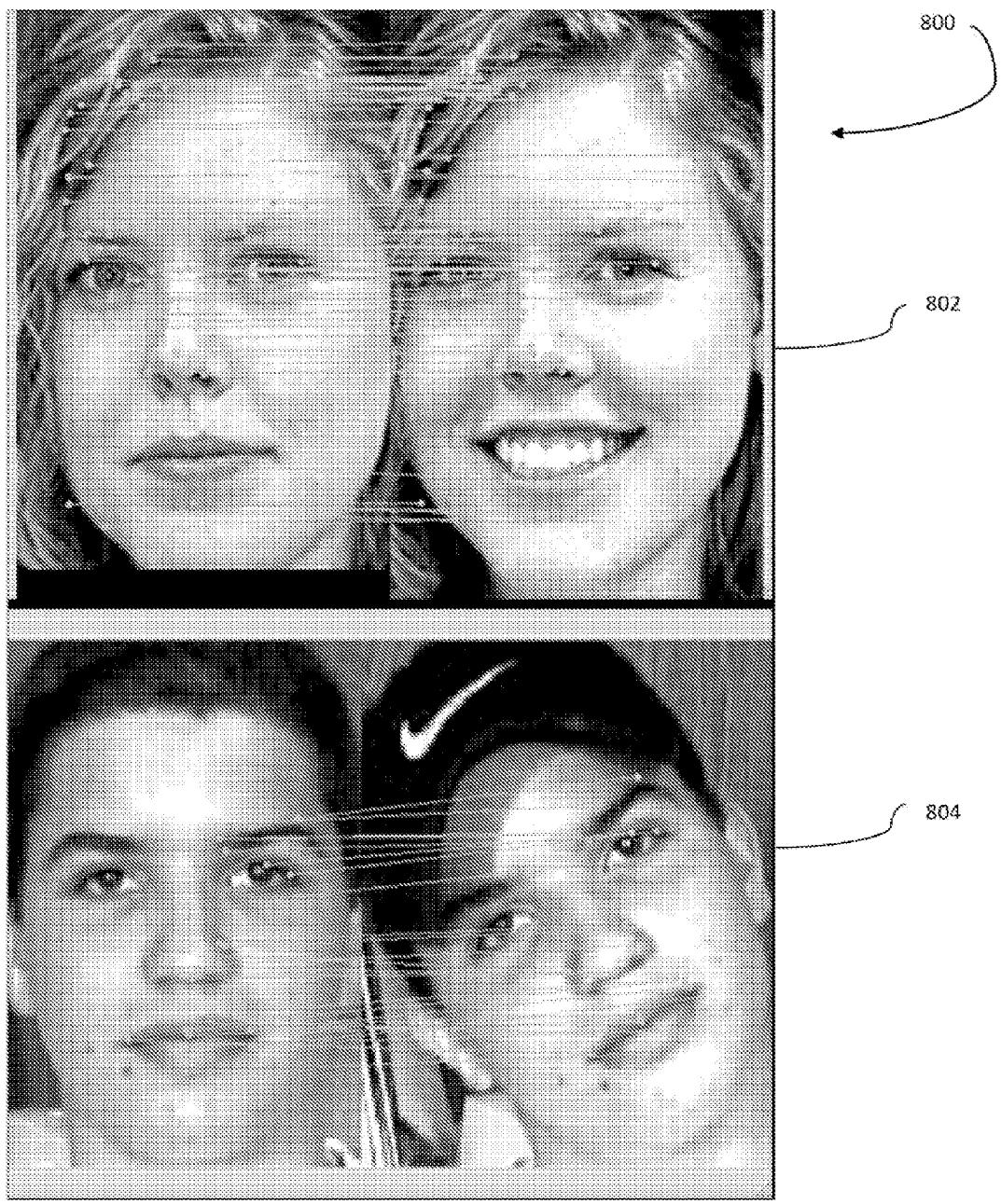
FIG. 8 illustrates a working example of feature matching of images having expression (upper images) and appearance (lower images) changes, according to embodiments of the invention.
Figure 9:
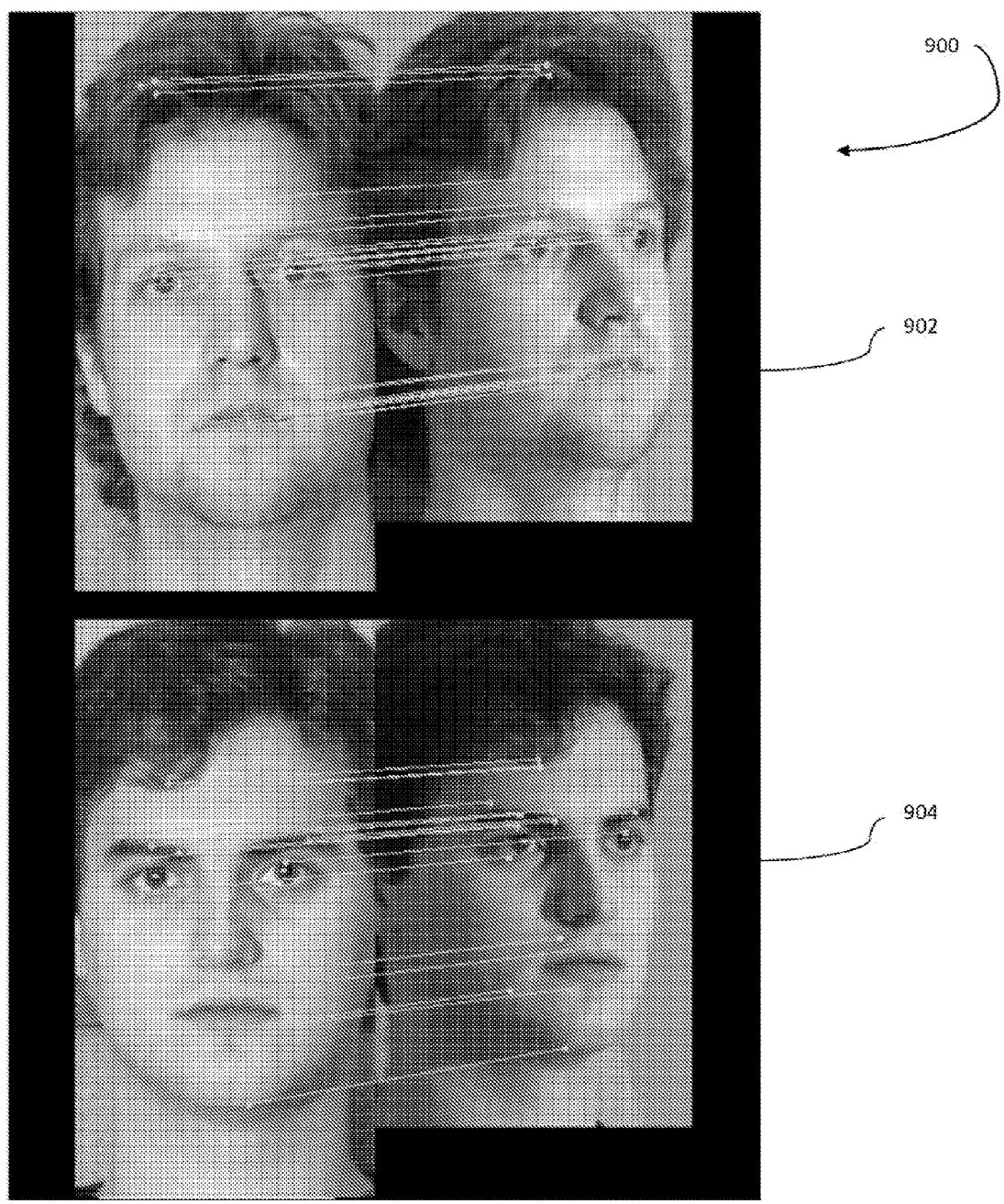
FIG. 9 illustrates a working example of feature matching of images having 30 degrees pose changes (upper images) and 30 degrees pose & illumination (lower images) changes, according to embodiments of the invention.
Figure 10:
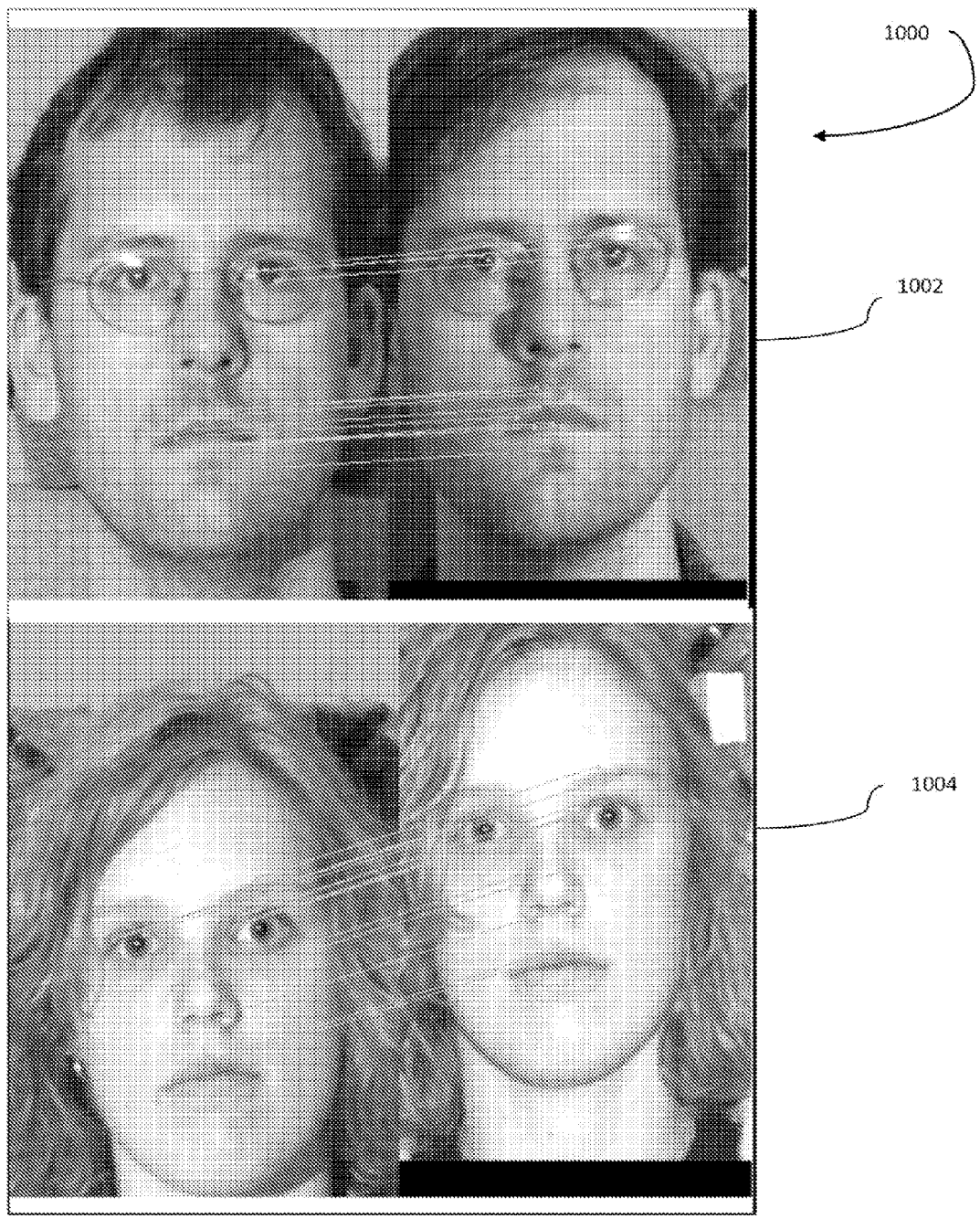
FIG. 10 illustrates a working example of feature matching of images having frontal appearance (upper images) and scale (lower images) changes, according to embodiments of the invention.

FIGS. 7 through 10 illustrate working examples of embodiments of the invention by matching facial features of the same individual under varying circumstances. FIGS. 7 and 8 are from the GT database and are used to illustrate how embodiments of the invention handle scale and other invariance properties. FIGS. 9 and 10 are from the Multi-PIE database for a pose change of 30 degrees, including illumination changes.

In particular, and as depicted as reference character 700, FIG. 7 illustrates a working example of feature matching of images having scale (upper images 702) and scale & appearance (lower images 704) changes, according to embodiments of the invention. Reference character 800, as depicted in FIG. 8, illustrates a working example of feature matching of images having expression (upper images 802) and appearance (lower images 804) changes. Reference character 900, as depicted in FIG. 9, illustrates a working example of feature matching of images having 30 degrees pose changes (upper images 902) and 30 degrees pose & illumination (lower images 904) changes. Reference character 1000, as depicted in FIG. 10 illustrates a working example of feature matching of images having frontal appearance (upper images 1002) and scale (lower images 1004) changes.

Embodiments of the invention yield results from both databases showing robustness to changes in appearance, expression, lighting and scale utilizing only one training sample. The embodiments of the invention algorithm is adaptable since it learns from the data itself lowering the demands on training data. In its current configuration is ideal for surveillance scenarios where multiple sensors are present and an object of interest in one scene needs to be found in scenes from other sensors.

Good results were obtained in session 1 for 15 degrees and 30 degrees cases, which indicates that the algorithm can handle illumination and pose changes up 30 degrees simultaneously. Results obtained with the GT database show the algorithm's capability to handle scale changes in addition to pose and illumination changes. Apart from presenting an efficient solution to the face recognition problem when training data is limited, embodiments of the invention also present an efficient method for combining SIFT descriptors from different images that are within the same class. Future research includes investigating ways to improve embodiments by perhaps adding global features to the regional ones currently in the dictionary. Other research areas may also include investigating the decision making approach related to the VB techniques model.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An adaptive face recognition system, comprising:
   at least one electronic processor having a central processing unit;
   at least one database having a plurality of pixilated face images of known subjects of interest, wherein said at least one database is associated with said at least one electronic processor;
   at least one test image, j, of a new subject of interest, wherein said at least one test image is a pixilated face image configured for input into said at least one electronic processor;
   a classification processing tool associated with said at least one electronic processor, wherein said classification processing tool is configured to build a dictionary, A, associated with said at least one database, wherein said classification processing tool is configured to provide a classification match of said at least one test image, j, with one of said plurality of pixilated face images of known subjects of interest; and
   at least one device associated with said at least one electronic processor configured to output in a tangible medium said classification match;
   wherein said classification processing tool is a non-transitory electronic-processor-readable medium having a plurality of electronic processor executable instructions stored thereon, that when executed by said at least one electronic processor, causes said at least one electronic processor to:
   input said at least one test image, j, into said at least one electronic processor;
   perform adaptive high-pass filtering, HF, on said at least one test image, j, to increase the number of keypoints, KP, in said at least one test image, j, to reduce changes in illumination in said at least one test image, j, wherein said keypoints, KP, are structures of interest in said at least one test image, j, including eyes, brows, nose, mouth, and hairline features, wherein said adaptive high-pass filtering, HF, uses at least two high-pass filters having different spatial frequency bandwidths dependent on the pixel size of said at least one test image, j;
   compute at least one scale invariant feature transform (SIFT) descriptor, N, for each of said at least one test image, j;
   recognize said new subject of interest in said at least one test image, j, by using an optimization technique, $l_1$, to search for a best match of said new subject of interest in said at least one test image, j, in said at least one database having a plurality of pixilated face images of known subjects of interest;
   determine whether to learn and alter the current knowledge of said dictionary, A from $A_{c(j-1)}$ to $A_{c(j)}$;
   output a class having maximum output, $q_{max}$;
   when it is determined to learn, adapt said dictionary, A, using reversed-orthogonal matching pursuit (OMP); and
   iterate through said recognize said new subject of interest in said at least one test image, j, by using an optimization technique, $l_1$, to search for a best match of said new subject of interest in said at least one test image, j, in said at least one database having a plurality of pixilated face images of known subjects of interest task, said determine whether to learn and alter the current knowledge of said dictionary, A task, and said output a class having maximum output, $q_{max}$, until it is determined not to learn.

2. The system according to claim 1, wherein said adaptive high-pass filtering task, comprises:
   passing said at least one test image, j, through said at least two adaptive high-pass filters, HF;
   extracting a plurality of keypoints, KP, from said at least one test image, j, by filtering said at least one test image, j, with each of said at least two adaptive high-pass filters, HF, wherein said extracting is performed by lowering the threshold of strength, t, wherein t=t−c, wherein c is a user-selected constant based on application-specific conditions;
   selecting, in each pass through each of said at least two adaptive high-pass filters, HF, at least one keypoint, KP, in said at least one test image, j;
   determining, in each pass through each of said at least two adaptive high-pass filters, HF, whether the number of keypoints, KP, is greater than or equal to the number of said descriptors, N, wherein said determination is expressed as KP≥N;
   when, in each pass through each of said at least two adaptive high-pass filters, said number of keypoints, KP, is not greater than or equal to the number of said at least one SIFT descriptor, N, iterating through said extracting a plurality of keypoints, KP, from said at least one test image, j, wherein said extracting is performed by lowering the threshold of strength, t, wherein t=t−c, wherein c is a user-selected constant based on application-specific conditions, until said number of keypoints KP is greater than or equal to the number of said at least one SIFT descriptor, N;
   extracting, in each pass through each of said at least two adaptive high-pass filters, HF, said at least one SIFT descriptor, N, from said at least one test image, j; and
   summing said at least one SIFT descriptor, N, from each pass through each of said at least two adaptive high-pass filters, HF, to yield a set of N-SIFT descriptors.

3. The system according to claim 2, wherein said recognition task, comprises:
   solving a matrix, X, by using a sparse solution, wherein said matrix X is said sparse solution for each of said at least one SIFT descriptor N in columns of matrix Y, wherein Y=AX; and
   summing number of matches per class, wherein said number of matches per class is vector q, wherein said vector q is the vector solution extracted from said matrix X for each class, c.

4. The system according to claim 3, wherein said determination whether to learn task, comprises:
   initializing model parameters for said summed number of matches per class, q;
   initializing the number of clusters to a user defined number, K, wherein each of said cluster is a Gaussian distribution selected from the group of matches consisting of said summed number of matches per class vector, q;

initializing the number of iterations, M, to a user selected number to update said model parameters and each of said Gaussian distribution, and initializing the actual number of iterations performed, $N_{iter}$, to 1 on the first iteration of said number of iterations, M, wherein $N_{iter}$ increases by 1 each time through said iteration;

updating model parameters for each potential k cluster, determining whether the actual number of iterations performed, $N_{iter}$, is greater than M;

when the number of actual iterations performed, $N_{iter}$, is not greater than M, iterating through said updating model parameters for each potential k cluster task, and said determining whether the actual number of iterations performed, $N_{iter}$, is greater than M, until the actual number of iterations performed, $N_{iter}$, is greater than M;

finding a cluster with the highest mean value, $\mu_c$;

when said cluster with the highest mean value, $\mu_c$, does not belong in the same class as $q_{max}$, learning does not occur and said dictionary $A_{c(j-1)}$ is not updated;

when said cluster with the highest mean value, $\mu_c$, belongs in the same class as $q_{max}$, determine whether said cluster with the highest mean value, $\mu_c$, has a single member, wherein when said cluster with the highest mean value, $\mu_c$, does not have a single member, learning does not occur and said dictionary A is not updated; and wherein when said cluster with the highest mean value, $\mu_c$, does have a single member, learning does occur and said dictionary $A_{c(j-1)}$ is updated to $A_{cj}$, with the columns of matrix Y.

5. The system according to claim 4, wherein said adapting said dictionary, A, using reversed-orthogonal matching pursuit (OMP), comprises:

inputting said columns of updated matrix, $Y_j$, for said dictionary, $A_{c(j-1)}$, and $q_{max}$ into a matrix $X_j$ by using a sparse solution, wherein said matrix $X_j$ is said sparse solution, wherein $A_{c(j-1)} = Y_j X_j$, wherein $Y_j$ is the set of N-SIFT descriptors extracted from said at least one test image, j;

finding a complement of $X_j$, wherein $Y_j = Y_j(X_j) \cup Y_j(X_j^c)$, wherein $X_j^c$ is the set of N-SIFT descriptors not used in said sparse solution; and updating said dictionary $A_{c(j-1)}$ to $A_{c(j)}$, wherein $A_{cj} = [A_{c(j-1)} Y(X_j^c)]$.

6. The system according to claim 5, wherein said outputting a class having the maximum output, $q_{max}$, comprises:

normalizing said number of matches per class, vector q, to find said class with the maximum energy, $q_{max}$; and outputting said class having maximum energy, $q_{max}$.

7. The system according to claim 1, wherein said tangible medium is a visual display screen.

8. A method for adaptive face recognition using an electronic processor, comprising:

providing at least one database having a plurality of pixilated face images of known subjects of interest;

providing at least one test image, j, of a new subject of interest, wherein said at least one test image is a pixilated face image configured for input into at least one electronic processor, providing a classification processing tool, wherein said classification processing tool is configured to build a dictionary, A, associated with said at least one database, wherein said classification processing tool is configured to provide a classification match of said at least one test image, j, with one of said plurality of pixilated face images of known subjects of interest; and outputting in a tangible medium said classification match; wherein said classification processing tool is a non-transitory electronic-processor-readable medium having a plurality of electronic processor executable instructions stored thereon, that when executed by an electronic processor, causes said at least one electronic processor to:

input said at least one test image, j, into said at least one electronic processor;

perform adaptive high-pass filtering, HF, on said at least one test image, j, to increase the number of keypoints, KP, in said at least one test image, j, to reduce changes in illumination in said at least one test image, j, wherein said keypoints, KP, are structures of interest in said at least one test image, j, including eyes, brows, nose, mouth, and hairline features, wherein said adaptive high-pass filtering, HF, uses at least two high-pass filters having different spatial frequency bandwidths dependent on the pixel size of said at least one test image, j;

compute at least one scale invariant feature transform (SIFT) descriptor, N, for each of said at least one test image, j;

recognize said new subject of interest in said at least one test image, j, by using an optimization technique, $l_1$, to search for a best match of said new subject of interest in said at least one test image, j, in said at least one database having a plurality of pixilated face images of known subjects of interest;

determine whether to learn and alter the current knowledge of said dictionary, A from $A_{c(j-1)}$ to $A_{c(j)}$;

output a class having maximum output, $q_{max}$;

when it is determined to learn, adapt said dictionary, A, using reversed-orthogonal matching pursuit (OMP); and iterate through said recognize said new subject of interest in said at least one test image, j, by using an optimization technique, $l_1$, to search for a best match of said new subject of interest in said at least one test image, j, in said at least one database having a plurality of pixilated face images of known subjects of interest task, said determine whether to learn task, and said output a class having maximum output, $q_{max}$, until it is determined not to learn.

9. The method according to claim 8, wherein said adaptive high-pass filtering task, comprises:

passing said at least one test image, j, through said at least two adaptive high-pass filters, HF;

extracting a plurality of keypoints, KP, from said at least one test image, j, by filtering said at least one test image, j, with each of said at least two adaptive high-pass filters, HF, wherein said extracting is performed by lowering the threshold of strength, t, wherein t=t−c, wherein c is a user-selected constant based on application-specific conditions;

selecting, in each pass through each of said at least two adaptive high-pass filters, HF, at least one keypoint, KP, in said at least one test image, j;

determining, in each pass through each of said at least two adaptive high-pass filters, HF, whether the number of keypoints, KP, is greater than or equal to the number of said descriptors, N, wherein said determination is expressed as KP≥N;

when, in each pass through each of said at least two adaptive high-pass filters, said number of keypoints, KP, is not greater than or equal to the number of said at least one SIFT descriptor, N, iterating through said extracting a plurality of keypoints, KP, from said at least one test image, j, wherein said extracting is performed by lowering the threshold of strength, t, wherein t=t−c, wherein c is a user-selected constant based on application-specific conditions, until said number of keypoints KP is greater than or equal to the number of said at least one SIFT descriptor, N;

extracting, in each pass through each of said at least two adaptive high-pass filters, HF, said at least one SIFT descriptor, N, from said at least one test image, j; and summing said at least one SIFT descriptor, N, from each pass through each of said at least two adaptive high-pass filters, HF, to yield a set of N-SIFT descriptors.

10. The method according to claim 9, wherein said recognition task, comprises:

solving a matrix, X, by using a sparse solution, wherein said matrix X is said sparse solution for each of said at least one SIFT descriptor N in columns of matrix Y, wherein Y=AX; and summing number of matches per class, wherein said number of matches per class is vector q, wherein said vector q is the vector solution extracted from said matrix X for each class, c.

11. The method according to claim 10, wherein said determination whether to learn task, comprises:

initializing model parameters for said summed number of matches per class, q;

initializing the number of clusters to a user defined number, K, wherein each of said cluster is a Gaussian distribution selected from the group of matches consisting of said summed number of matches per class vector, q;

initializing the number of iterations, M, to a user selected number to update said model parameters and each of said Gaussian distribution, and initializing the actual number of iterations performed, $N_{iter}$, to 1 on the first iteration of said number of iterations, M, wherein $N_{iter}$ increases by 1 each time through said iteration;

updating model parameters for each potential k cluster;

determining whether the actual number of iterations performed, $N_{iter}$, is greater than M;

when the number of actual iterations performed, $N_{iter}$, is not greater than M, iterating through said updating model parameters for each potential k cluster task, and said determining whether the actual number of iterations performed, $N_{iter}$, is greater than M, until the actual number of iterations performed, $N_{iter}$, is greater than M;

finding a cluster with the highest mean value, $\mu_c$;

when said cluster with the highest mean value, $\mu_c$, does not belong in the same class as $q_{max}$, learning does not occur and said dictionary $A_{c(j-1)}$ is not updated;

when said cluster with the highest mean value, $\mu_c$, belongs in the same class as $q_{max}$, determine whether said cluster with the highest mean value, $\mu_c$, has a single member;

wherein when said cluster with the highest mean value, $\mu_c$, does not have a single member, learning does not occur and said dictionary A is not updated; and wherein when said cluster with the highest mean value, $\mu_c$, does have a single member, learning does occur and said dictionary $A_{c(j-1)}$, is updated to $A_{cj}$, with the columns of matrix Y.

12. The method according to claim 11, wherein said adapting said dictionary, A, using reversed-orthogonal matching pursuit (OMP), comprises:

inputting said columns of updated matrix, $Y_j$, for said dictionary, $A_{c(j-1)}$, and $q_{max}$ into a matrix $X_j$ by using a sparse solution, wherein said matrix $X_j$ is said sparse solution, wherein $A_{c(j-1)}=Y_jX_j$, wherein $Y_j$ is the set of N-SIFT descriptors extracted from said at least one test image, j;

finding a complement of $X_j$, wherein $Y_j=Y_j(X_j) \cup Y_j(X_j^c)$, wherein $X_j^c$ is the set of N-SIFT descriptors not used in said sparse solution; and updating said dictionary $A_{c(j-1)}$ to $A_{c(j)}$, wherein $A_{cj}=[A_{c(j-1)} Y(X_j^c)]$.

13. The method according to claim 12, wherein said outputting a class having the maximum output, $q_{max}$, comprises:

normalizing said number of matches per class, vector q, to find said class with the maximum energy, $q_{max}$; and outputting said class having maximum energy, $q_{max}$.

14. The method according to claim 8, wherein said tangible medium is a visual display screen.

* * * * *